Patented May 4, 1948

2,440,781

UNITED STATES PATENT OFFICE 2,440,781

INSECTICIDAL FUMIGANT COMPOSITION WITH SOLID RUBBER CARRIER PARTICLES

Charles W. Murray, Glenside, Pa., assignor to the United States of America as represented by the Secretary of Agriculture No Drawing. Application March 12, 1942,
Serial No. 434,310

6 Claims. (Cl. 167—39)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

The principal object of this invention is the preparation of insecticidal materials from organic materials and polymers such as rubber and plastics.

The general purpose of this invention is to provide a more efficient means of applying as insecticides such materials as ethylene dichloride, chloropicrin, carbon disulfide, methyl bromide, para-dichlorobenzene, naphthalene, etc.

In certain operations having to do with control of insects it is very difficult, if not impossible, to apply the chemical uniformly and without injury to the plant. An example is the use of ethylene dichloride emulsion in the control of peach borer. The emulsion breaks rather easily, and, therefore, in applying the material, the various trees receive different amounts of the insecticide. Also, when applied in this manner, there may be some injury because of contact of the liquid with tender parts of the tree system.

Many volatile toxic materials cannot now be used as insecticidal sprays or dusts because they are not retained on the plant for long enough periods to be practical for control purposes.

This invention is designed to improve the handling properties of volatile liquid insecticides, to render them less toxic to plants and to enlarge the field of useful insecticides by prolonging their action when sprayed or dusted on plants.

I have found by experiment that various forms of rubber will retain organic materials for varying lengths of time. The following table shows the retaining properties of hard and soft rubber dusts as compared with an equal weight of pyrophylite, a dusty, crystalline material. All materials were treated with 2 percent of the indicated chemical.

|  | Hard Rubber Dust | Soft Rubber Dust | Pyrophylite |
|---|---|---|---|
| Ethylene dichloride | 75 minutes | 55 minutes | 17 minutes |
| Carbon disulfide | 55 minutes | 30 minutes | 6 minutes |
| Chloropicrin | 26 hours | 135 minutes | 60 minutes |

Time chemical was retained by the dust or mineral.

In each case the rubber materials prolonged substantially the fumigating effects of the chemicals.

It is also possible to incorporate certain solid materials in the rubber particles by means of a solvent. For instance, para-dichlorobenzene may be dissolved in ethylene dichloride and this mixture added to rubber particles. Both liquid and solid will be incorporated uniformly in the rubber.

One satisfactory procedure for accomplishment of the above is to make a 10 percent solution of para-dichlorobenzene in ethylene dichloride. Then add 20 cubic centimeters of this mixture directly with agitation to 100 grams of 60 mesh ground soft rubber. The resulting mixture may be used directly in certain types of soil fumigations.

Other types of rubber besides soft may be used. For instance, hard rubber as well as synthetic hard and soft rubbers are equally efficient. Other chemicals besides ethylene dichloride and para-dichlorobenzene may be used as chloropicrin, carbon disulfide, naphthalene, camphor, etc.

Condensation polymers, as urea-formaldehyde; linear polymers, as methyl methacrylate; and copolymers, as methyl methacrylate-ethyl acrylate have a tendency either to react with or be dissolved by the liquid insecticides mentioned above, namely, carbon disulfide, ethylene dichloride, chloropicrin, etc. The more volatile chemicals are not retained well, and those that are soluble in water are readily washed out of the plastic. Some of the ground scrap plastics may be treated with certain of the organic insecticides to give a combination of the plastic and the insecticide.

The following table shows the retentive properties of some plastic molding powders:

|  | Cellulose Acetate | Vinyl Resin | Phenol-Formaldehyde | Styrene |
|---|---|---|---|---|
| Ethylene dichloride | Hrs. 2 | Hrs. 1 | Does not absorb chemicals in cold except only slightly over long period of time. | Hrs. 2 |
| Chloropicrin | 3 | 2 |  | 3 |
| Carbon disulfide | 1 | ½ |  | ¼ |

Time chemical was retained.

These chemicals volatilize at different rates from the above powders, and, therefore, the latter are valuable carriers for this type of insecticide.

Having thus described my invention, what I claim for Letters Patent is:

1. A composition comprising a volatile liquid insecticide and a vehicle therefor consisting of dry hard rubber in finely divided form.

2. A composition of matter comprising a volatile liquid insecticide and finely divided solid rubber as a vehicle therefor, said finely divided rubber being present in major amount.

3. The composition described in claim 1, in which the volatile liquid insecticide is ethylene dichloride.

4. The composition described in claim 2 in which the volatile liquid insecticide is ethylene dichloride, and having an ordinarily solid insecticide dissolved in the ethylene dichloride.

5. The composition described in claim 2 in which the volatile liquid insecticide is ethylene dichloride, and having para-dichlorobenzene incorporated therewith.

6. The composition described in claim 2, in which the volatile liquid insecticide is an aliphatic halogen compound.

CHARLES W. MURRAY.

REFERENCES CITED

The following references are of record in the file of this patent:

UNITED STATES PATENTS

| Number | Name | Date |
| --- | --- | --- |
| 1,897,573 | Curran | Feb. 14, 1933 |
| 1,908,619 | Wieder | May 9, 1933 |
| 2,051,840 | Gerhart | Aug. 25, 1936 |
| 2,061,570 | Frolich et al. | Nov. 24, 1936 |
| 2,101,587 | Levine | Dec. 7, 1937 |

FOREIGN PATENTS

| Number | Country | Date |
| --- | --- | --- |
| 455,605 | Great Britain | Oct. 23, 1936 |